United States Patent
Miyahara et al.

(10) Patent No.: US 11,400,422 B2
(45) Date of Patent: Aug. 2, 2022

(54) CERAMIC SUPPORT, ZEOLITE MEMBRANE COMPLEX, METHOD OF PRODUCING ZEOLITE MEMBRANE COMPLEX, AND SEPARATION METHOD

(71) Applicant: NGK INSULATORS, LTD., Nagoya (JP)

(72) Inventors: Makoto Miyahara, Nagoya (JP); Kenichi Noda, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 148 days.

(21) Appl. No.: 17/015,413

(22) Filed: Sep. 9, 2020

(65) Prior Publication Data
US 2020/0406202 A1 Dec. 31, 2020

Related U.S. Application Data

(63) Continuation of application No. PCT/JP2019/000322, filed on Jan. 9, 2019.

(30) Foreign Application Priority Data

Mar. 30, 2018 (JP) .............................. JP2018-067398

(51) Int. Cl.
*B01D 53/22* (2006.01)
*B01D 69/10* (2006.01)
(Continued)

(52) U.S. Cl.
CPC ....... *B01D 69/105* (2013.01); *B01D 67/0051* (2013.01); *B01D 69/122* (2013.01);
(Continued)

(58) Field of Classification Search
CPC .. B01D 69/105; B01D 69/145; B01D 69/122; B01D 67/0051; B01D 2325/10
See application file for complete search history.

(56) References Cited

U.S. PATENT DOCUMENTS 2,084,005 A * 6/1937 Richards ................ A01G 27/06
239/DIG. 15
2,801,186 A * 7/1957 Alexander ............ C09C 1/3081
106/490

(Continued)

FOREIGN PATENT DOCUMENTS

| CN | 101502760 A | 8/2009 |
|---|---|---|
| JP | 3316173 B2 | 8/2002 |

(Continued)

OTHER PUBLICATIONS

Chinese Office Action (Application No. 201980015692.8) dated Nov. 26, 2021.

(Continued)

*Primary Examiner* — Anthony R Shumate
(74) *Attorney, Agent, or Firm* — Burr & Brown, PLLC (57) ABSTRACT

A support is a porous ceramic support for supporting a zeolite membrane. The hydraulic conductivity of the support is less than or equal to $1.1 \times 10^{-3}$ m/s. In the support, the total content of alkali metal and alkaline earth metal in a surface part within 30 μm from a surface in a depth direction perpendicular to the surface is less than or equal to 1% by weight.

10 Claims, 7 Drawing Sheets

(51) Int. Cl.
*B01D 67/00* (2006.01)
*B01D 69/12* (2006.01)
*B01D 69/14* (2006.01)
*B01D 71/02* (2006.01)

(52) U.S. Cl.
CPC ......... *B01D 69/145* (2013.01); *B01D 71/027* (2013.01); *B01D 2325/10* (2013.01)

(56) References Cited

U.S. PATENT DOCUMENTS

| | | | | |
|---|---|---|---|---|
| 3,346,509 | A | * | 10/1967 | Stewart ................. C10G 11/04 502/238 |
| 3,377,265 | A | * | 4/1968 | Caesar ................. C25B 11/091 429/405 |
| 3,395,035 | A | * | 7/1968 | Strauss ................... B64G 1/58 260/998.13 |
| 3,468,815 | A | * | 9/1969 | Cole ........................ C07C 4/06 502/64 |
| 3,506,561 | A | * | 4/1970 | Caesar ................... H01M 4/86 204/290.01 |
| 3,562,183 | A | * | 2/1971 | Sonz ....................... B01J 23/22 549/248 |
| 3,672,988 | A | * | 6/1972 | Tamai .................... G03G 5/104 430/131 |
| 3,745,127 | A | * | 7/1973 | Asher ..................... B01J 23/04 429/534 |
| 3,790,475 | A | * | 2/1974 | Eaton .................... C03C 11/005 210/656 |
| 2008/0047432 | A1 | | 2/2008 | Nonaka et al. |
| 2010/0086731 | A1 | | 4/2010 | Noguchi et al. |
| 2011/0253619 | A1 | | 10/2011 | Aizawa |
| 2013/0266502 | A1 | * | 10/2013 | Lichty .................... C01B 3/061 422/600 |
| 2014/0357476 | A1 | | 12/2014 | Bischof et al. |
| 2017/0229697 | A1 | * | 8/2017 | Hayashi ............. H01M 50/449 |
| 2017/0259214 | A1 | | 9/2017 | Onozuka et al. |
| 2017/0361282 | A1 | | 12/2017 | Kinoshita et al. |
| 2017/0368509 | A1 | | 12/2017 | Nagasaka et al. |
| 2019/0001278 | A1 | | 1/2019 | Miyahara et al. |

FOREIGN PATENT DOCUMENTS

| | | | |
|---|---|---|---|
| JP | | 2005-262043 A1 | 9/2005 |
| JP | | 2008-074695 A1 | 4/2008 |
| JP | | 2010-089990 A1 | 4/2010 |
| JP | | 2011-000588 A1 | 1/2011 |
| JP | | 2012-110849 A1 | 6/2012 |
| JP | | 4961322 B2 | 6/2012 |
| JP | | 2016-523800 A1 | 8/2016 |
| WO | | 2016/084845 A1 | 6/2016 |
| WO | | 2016/158582 A1 | 10/2016 |
| WO | | 2016/158583 A1 | 10/2016 |
| WO | WO | 2016/084845 A1 | 8/2017 |
| WO | | 2017/169591 A1 | 10/2017 |
| WO | WO | 2016/158582 A1 | 1/2018 |
| WO | WO | 2016/158583 A1 | 1/2018 |
| WO | WO | 2017/169591 A1 | 1/2019 |

OTHER PUBLICATIONS

English translation of the International Preliminary Report on Patentabiliy (Chapter I) (Application No. PCT/JP2019/000322) dated Oct. 15, 2020.
International Search Report and Written Opinion (Application No. PCT/JP2019/000322) dated Apr. 2, 2019.

* cited by examiner

CERAMIC SUPPORT, ZEOLITE MEMBRANE COMPLEX, METHOD OF PRODUCING ZEOLITE MEMBRANE COMPLEX, AND SEPARATION METHOD

CROSS-REFERENCE TO RELATED APPLICATION

The present application is a continuation application of International Application No. PCT/JP2019/322, filed on Jan. 9, 2019, which claims priority to Japanese Patent Application No. 2018-67398, filed on Mar. 30, 2018. The contents of these applications are incorporated herein by reference in their entirety.

TECHNICAL FIELD

The present invention relates to a ceramic support, a zeolite membrane complex, a method of producing a zeolite membrane complex, a separation method of mixture of substances using a zeolite membrane complex.

BACKGROUND ART

Currently, various kinds of researches and developments are carried out on applications, such as separation of specific molecules, adsorption of molecules, using a molecular sieving function of zeolite in the form of a zeolite membrane complex which is obtained by forming a zeolite membrane on a support.

A method of immersing a porous ceramic support formed of aluminum oxide or the like in a starting material solution and synthesizing a zeolite membrane on the support by hydrothermal synthesis is known as one of methods of producing zeolite membrane complexes. Since the hydrothermal synthesis is performed under high temperature and pressure, there is a possibility that constituent components in the support may be eluted into the starting material solution. The substances eluted from the support may have an adverse effect on synthesis of zeolite membrane. Specifically, a zeolite membrane having a composition ratio different from a desired composition ratio may be synthesized. Performance of zeolite membrane may be degraded because of different phase synthesized as by-product in the zeolite membrane. Alternatively, defective coating on the support surface (e.g., pinholes in the zeolite membrane or the like) may be caused since the formation of the zeolite membrane is inhibited.

Thus, Japanese Patent No. 3316173 (Document 1) proposes a technique for reducing an elution amount of a support into a starting material solution by forming the support with tantalum oxide or niobium oxide.

On the other hand, Japanese Patent No. 4961322 (Document 2) proposes an alumina substrate which is used as a support for zeolite membrane and which contains 1% to 4% by weight of alkali metal oxide and/or alkaline earth metal oxide.

International Publication WO 2016/084845 (Document 3) discloses a zeolite membrane complex in which part of a zeolite membrane penetrates into an inside of a porous support. When producing the zeolite membrane complex, inorganic particles are deposited on the support by direct rubbing or the like, and then the zeolite membrane is formed. As above, by depositing the inorganic particles on the support to form a layer of the inorganic particles in pores of the support, the zeolite membrane is suppressed from excessively penetrating into the pores of the support.

The support of Document 1 is formed of expensive material that is tantalum oxide or niobium oxide, and thus, production cost of the zeolite membrane complex increases. Since the support of Document 2 contains a relatively large amount of alkali metal or alkaline earth metal, there may be a case where abnormality (for example, difference in a composition ratio of the zeolite membrane, performance degradation due to different phase synthesized as by-product, or defect such as pinholes) occurs in the zeolite membrane by elution of alkali metal or alkaline earth metal from the support during hydrothermal synthesis. Also in the support of Document 3, since the surface of the support having the inorganic particles is partially exposed outside of the inorganic particles and is in contact with the starting material solution, alkali metal or alkaline earth metal contained in the support as a sintering additive or impurities is eluted from the support during hydrothermal synthesis. Thus, in a similar way to the support of Document 2, there may be a case where abnormality occurs in the zeolite membrane because of eluted alkali metal or alkaline earth metal.

SUMMARY OF INVENTION

The present invention is intended for a porous ceramic support for supporting a zeolite membrane. In the ceramic support according to a preferable embodiment of the present invention, a hydraulic conductivity is less than or equal to $1.1 \times 10^{-3}$ m/s, and a total content of alkali metal and alkaline earth metal in a surface part within 30 μm from a surface in a depth direction perpendicular to the surface is less than or equal to 1% by weight. By the present invention, it is possible to suppress occurrence of abnormality in the zeolite membrane.

Preferably, a porosity of the surface part is less than or equal to 50%.

Preferably, the support includes an intermediate layer including the surface part, and a support layer that supports the intermediate layer from a side opposite to a surface of the intermediate layer which comes into contact with a zeolite membrane, the support layer having a mean particle diameter greater than that of the intermediate layer.

The present invention is also intended for a zeolite membrane complex. The zeolite membrane complex according to a preferable embodiment of the present invention includes the above ceramic support, and a zeolite membrane formed on the ceramic support.

Preferably, a percentage of surface abnormality in a surface of the zeolite membrane is less than or equal to 15%.

Preferably, a thickness of the zeolite membrane is greater than or equal to 0.1 μm and less than or equal to 30 μm.

Preferably, a content of silicon oxide in the zeolite membrane is 10 times or more a content of aluminum oxide.

The present invention is also intended for a method of producing a zeolite membrane complex. The method of producing a zeolite membrane complex according to a preferable embodiment of the present invention includes a) preparing the above ceramic support, b) preparing seed crystals, c) depositing the seed crystals on the ceramic support, and d) immersing the ceramic support in a starting material solution and growing zeolite from the seed crystals by hydrothermal synthesis, to thereby form a zeolite membrane on the ceramic support.

The present invention is also intended for a separation method. The separation method according to a preferable embodiment of the present invention includes a) preparing the above zeolite membrane complex, and b) supplying a mixture of substances containing a plurality of types of gases or liquids to the zeolite membrane complex and allowing a high-permeability substance in the mixture of substances to permeate through the zeolite membrane complex, to thereby separate the high-permeability substance from other substances.

Preferably, the mixture of substances includes at least one of following substances: hydrogen, helium, nitrogen, oxygen, water, steam, carbon monoxide, carbon dioxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

These and other objects, features, aspects and advantages of the present invention will become more apparent from the following detailed description of the present invention when taken in conjunction with the accompanying drawings.

DESCRIPTION OF EMBODIMENTS

Figure 1:
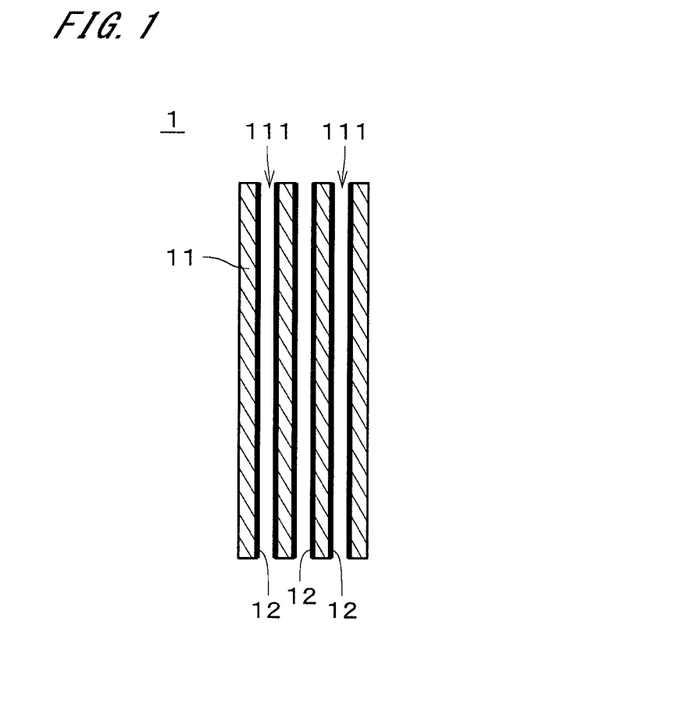
FIG. 1 is a sectional view of a zeolite membrane complex.

FIG. 1 is a sectional view of a zeolite membrane complex 1 according to an embodiment of the present invention. The zeolite membrane complex 1 includes a porous ceramic support 11 and a zeolite membrane 12 formed on a surface of the ceramic support 11. The ceramic support 11 is a support for supporting a zeolite membrane, and hereinafter is simply referred to as "support 11".

In the example illustrated in FIG. 1, the support 11 is a monolith support, having a substantially circular columnar shape, where a plurality of through holes 111 each extending in a longitudinal direction (i.e., the vertical direction in the drawing) are formed. Each through hole 111 (i.e., cell) has, for example, a substantially circular cross-section perpendicular to the longitudinal direction. In the illustration of FIG. 1, the diameter of the through holes 111 is greater than the actual diameter, and the number of through holes 111 is smaller than the actual number. The zeolite membrane 12 is formed on the inner surfaces of the through holes 111 and covers substantially the entire inner surfaces of the through holes 111. In FIG. 1, the zeolite membrane 12 is illustrated with bold lines.

The support 11 has a length (i.e., the length in the vertical direction in the drawing) of, for example, 10 cm to 200 cm. The support 11 has an outer diameter of, for example, 0.5 cm to 30 cm. The distance between the central axes of each pair of adjacent through holes 111 is, for example, in the range of 0.3 mm to 10 mm. The surface roughness (Ra) of the support 11 is, for example, in the range of 0.1 μm to 2.0 μm and preferably in the range of 0.2 μm to 1.0 μm. Alternatively, the support 11 may have a different shape such as a honeycomb shape, a flat plate shape, a tubular shape, a circular cylindrical shape, a circular columnar shape, or a polygonal prism shape. When having a tubular shape, the support 11 has a thickness of, for example, 0.1 mm to 10 mm.

In the present embodiment, the support 11 is a porous member permeable to gases and liquids (i.e., fluids). The zeolite membrane 12 is a molecular separation membrane that separates a specific substance from a mixed fluid obtained by mixing a plurality of types of substances, using a molecular sieving function. For example, the zeolite membrane 12 may be used as a gas separation membrane that separates a specific gas from a mixed gas containing a plurality of types of gases. Alternatively, the zeolite membrane 12 may be used as a liquid separation membrane that separates a specific liquid from a mixed liquid containing a plurality of types of liquids. The zeolite membrane 12 may be used as a separation membrane that separates a specific substance from a mixed fluid obtained by mixing a gas(es) and a liquid(s). The zeolite membrane 12 may be used as a pervaporation membrane. The zeolite membrane complex 1 may be used for other applications.

As the material for the support 11, various ceramics may be employed as long as they have chemical stability in the step of forming the zeolite membrane 12 on the surface. Examples of the ceramic sintered compact to be selected as the material for the support 11 include alumina, silica, mullite, zirconia, titania, yttria, silicon nitride, and silicon carbide. In the present embodiment, the support 11 contains at least one of alumina, silica, and mullite. The support 11 may contain an inorganic binder. The inorganic binder may be at least one of titania, mullite, easily sinterable alumina, silica, glass frit, clay minerals, and easily sinterable cordierite. The support 11 contains alkali metal and/or alkaline earth metal. The alkali metal and alkaline earth metal are, for example, sodium (Na), potassium (K), calcium (Ca), magnesium (Mg), or the like.

The support 11 has a hydraulic conductivity less than or equal to $1.1 \times 10^{-3}$ m/s, preferably less than or equal to $5.8 \times 10^{-4}$ m/s, and more preferably less than or equal to $2.3 \times 10^{-4}$ m/s. The lower limit of the hydraulic conductivity of the support 11 is not particularly limited as long as it is greater than 0 m/s. The hydraulic conductivity is typically greater than or equal to $1.1 \times 10^{-5}$ m/s, and more typically greater than or equal to $1.2 \times 10^{-4}$ m/s.

The hydraulic conductivity of the support 11 was measured as below. First, by sealing one end of the support 11 in the longitudinal direction, one side of each through hole 111 (i.e., cell) of the support 11 was blocked. Subsequently, distilled water was supplied into the through holes 111 from the other end of the support 11 in the longitudinal direction. At this time, the flow rate, pressure, and temperature of the supplied distilled water were measured. Next, the flow rate of distilled water that is led out from the outer side face of the support 11 through the support 11 was measured. The measured results were converted into values under a pressurized condition of 0.1 MPa at a water temperature of 25° C., and the hydraulic conductivity that is an amount of water per unit area which permeates through the support 11 per unit time was obtained on the basis of the converted values.

Figure 2:
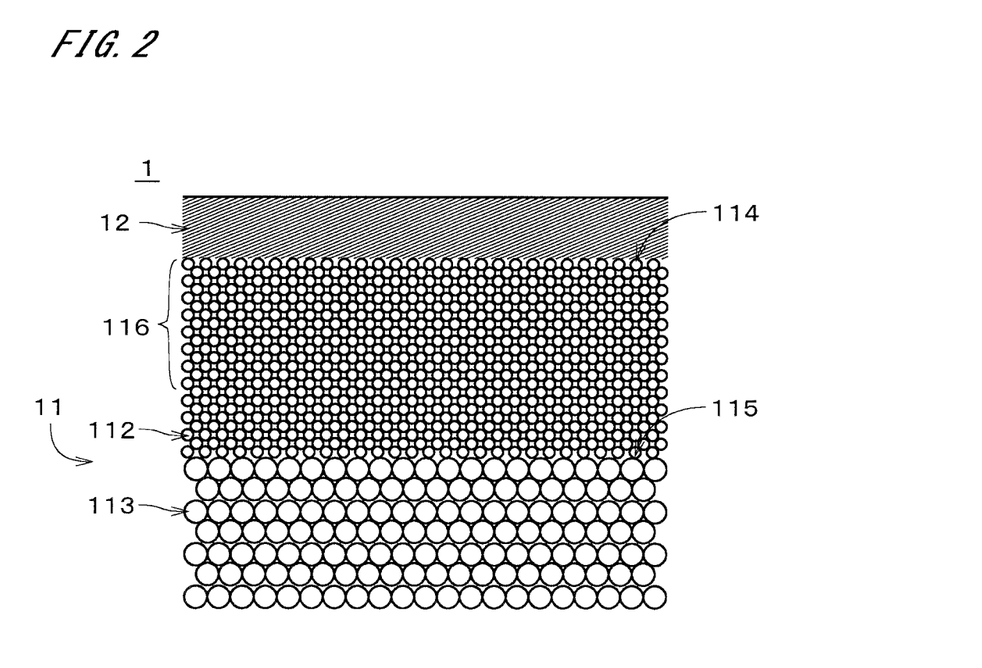
FIG. 2 is an enlarged sectional view of the zeolite membrane complex.

FIG. 2 is a sectional view of part of the zeolite membrane complex 1 in enlarged dimensions. The support 11 is a layered structure including an intermediate layer 112 and a support layer 113. The material for each of the intermediate layer 112 and the support layer 113 may be any of the above-described materials. The intermediate layer 112 and the support layer 113 may be formed of the same material, or may be formed of different materials. The intermediate layer 112 is in direct contact with the zeolite membrane 12 to support the zeolite membrane 12. The surface 114 of the intermediate layer 112 which is in contact with the zeolite membrane 12 is the inner surfaces of the through holes 111 of the support 11. The support layer 113 supports the intermediate layer 112 from a side opposite to the zeolite membrane 12. In other words, the support layer 113 supports the intermediate layer 112 from the side opposite to the surface 114 of the intermediate layer 112 which is in contact with the zeolite membrane 12. In FIG. 2, a portion of the support 11 in the vicinity of the intermediate layer 112 is illustrated.

The intermediate layer 112 is formed of particles having a relatively small mean particle diameter. The support layer 113 is formed of particles having a mean particle diameter greater than that of the intermediate layer 112. The mean particle diameter of the particles constituting the intermediate layer 112 (i.e., framework particles) is preferably in the range of 0.001 μm to 100 μm, more preferably in the range of 0.01 μm to 80 μm, and yet more preferably in the range of 0.1 μm to 50 μm. The mean particle diameter of the particles constituting the support layer 113 (i.e., framework particles) is preferably in the range of 5 μm to 200 μm, more preferably in the range of 25 μm to 170 μm, and yet more preferably in the range of 50 μm to 150 μm. A polished surface formed by polishing the intermediate layer 112 is observed with a scanning electron microscope (SEM), and an average of particle diameters of twenty framework particles which are randomly selected is obtained as the mean particle diameter of the intermediate layer 112. The particle diameter of each framework particle is obtained as an average of the maximum diameter and the minimum diameter of the framework particle. The same applies to the mean particle diameter of the support layer 113.

The mean pore diameter of the intermediate layer 112 is less than the mean pore diameter of the support layer 113. The mean pore diameter of the intermediate layer 112 is preferably in the range of 0.001 μm to 1 μm, more preferably in the range of 0.01 μm to 1 μm, and yet more preferably in the range of 0.05 μm to 0.5 μm. The mean pore diameter of the support layer 113 is preferably in the range of 0.5 μm to 50 μm, more preferably in the range of 1 μm to 30 μm, and yet more preferably in the range of 10 μm to 25 μm. The mean pore diameters of the intermediate layer 112 and the support layer 113 can be measured by, for example, a mercury porosimeter, a perm porosimeter, or a nano-perm porosimeter.

The porosity of the intermediate layer 112 is preferably less than or equal to 50%, more preferably less than or equal to 40%, and yet more preferably less than or equal to 30%. The lower limit of the porosity of the intermediate layer 112 is not particularly limited as long as it is greater than 0%. The porosity is typically greater than or equal to 5%, and more typically greater than or equal to 10%. The porosity of the support layer 113 is preferably in the range of 5% to 50%, more preferably in the range of 10% to 45%, and yet more preferably in the range of 15% to 40%. The porosity of the support layer 113 was measured by mercury injection with only the support layer 113 as the measurement target. The porosity of the intermediate layer 112 was obtained by acquiring an image of the section of the intermediate layer 112 with an electron microscope and by performing an image analysis on an image obtained by binarizing the acquired image.

The thickness of the intermediate layer 112 is, for example, in the range of 5 μm to 500 μm, preferably in the range of 10 μm to 400 μm, and more preferably in the range of 15 μm to 300 μm. The thickness of the intermediate layer 112 is a distance between the surface 114 of the intermediate layer 112 and the surface 115 of the support layer 113 in a depth direction substantially perpendicular to the surface 114 of the intermediate layer 112 (i.e., the radial direction of the through hole 111 of the support 11). The positions of the surface 114 of the intermediate layer 112 and the surface 115 of the support layer 113 can be obtained, for example, by observing the SEM image of the section of the support 11.

In the following description, a portion of the support 11 within 30 μm from the surface 114 in the above depth direction is referred to as a "surface part 116". In other words, the surface part 116 refers to, in the support 11, the whole of the portion between a position at 30 μm depth from the surface 114 and the surface 114 of the support 11. When the thickness of the intermediate layer 112 is greater than 30 μm, the whole of the surface part 116 is included in the intermediate layer 112 and part of the intermediate layer 112 exists between the surface part 116 and the support layer 113, as shown in FIG. 2. When the thickness of the intermediate layer 112 is 30 μm, the surface part 116 is identical to the intermediate layer 112. In any of these cases, the intermediate layer 112 includes the whole of the surface part 116.

The porosity of the surface part 116 is the same as that of the intermediate layer 112. Specifically, the porosity of the surface part 116 is preferably less than or equal to 50%, more preferably less than or equal to 40%, and yet more preferably less than or equal to 30%. The lower limit of the porosity of the surface part 116 is not particularly limited as long as it is greater than 0%. The porosity is typically greater than or equal to 5%, and more typically greater than or equal to 10%. The mean particle diameter of the framework particles and the mean pore diameter in the surface part 116 are the same as those of the intermediate layer 112.

As described above, although the support 11 contains at least one of alkali metal and alkaline earth metal, the support 11 may not contain both of them as appropriate. In this regard, when the support 11 does not contain both of alkali metal and alkaline earth metal, the sintering temperature of the support 11 tends to increase. The total content of alkali metal and alkaline earth metal in the surface part 116 is less than or equal to 1% by weight, preferably less than or equal to 0.5% by weight, more preferably less than or equal to 0.1% by weight. The lower limit of the total content is not particularly limited. The total content is typically greater than or equal to 0.0001% by weight, and more typically greater than or equal to 0.001% by weight. The total content of alkali metal and alkaline earth metal can be measured by X-ray photoelectron spectrometry.

The intermediate layer 112 is produced, for example, as below. First, an aggregate for the intermediate layer 112, an organic binder, a pH adjuster, and a surfactant are added to water, and they are mixed for 12 hours or more with a ball mill. The purpose of mixing is not pulverization of the intermediate layer aggregate but peptization (loosening), and thus, balls having a lower hardness than the intermediate layer aggregate are used in the ball mill. For example, when the intermediate layer aggregate is made of alumina, zirconia balls are used in the ball mill. The slurry concentration (i.e., concentration of the intermediate layer aggregate) in ball milling is preferably less than or equal to 50%. Since the slurry concentration is made less than or equal to 50%, it is conceivable that the organic binder, the pH adjuster, and the surfactant become easy to act on the intermediate layer aggregate. After that, the above slurry is diluted with a predetermined amount of water. A defoamer is preferably added to the water. Further, it is preferable that a pH adjuster is added to the water to substantially equalize the pH of the water containing the defoamer and the pH adjuster with the pH of the slurry before dilution with the water. Therefore, occurrence of re-flocculation due to change in pH of the slurry by the defoamer can be suppressed. Next, the slurry diluted with the water is degassed with stirring under vacuum, and therefore the slurry for the intermediate layer 112 is prepared. Since the dispersibility of the slurry for the intermediate layer 112 is improved by the above step, it is possible to obtain the intermediate layer 112 having high strength with reduced total content of alkali metal and alkaline earth metal even when the firing temperature is relatively low. An inorganic binder (e.g., titanium oxide or the like) may be added as a sintering additive to the slurry for the intermediate layer 112 if necessary.

The thickness of the zeolite membrane 12 is, for example, in the range of 0.1 μm to 30 μm, preferably in the range of 0.5 μm to 20 μm, and more preferably in the range of 1 μm to 10 μm. As the thickness of the zeolite membrane 12 increases, separation performance improves. As the thickness of the zeolite membrane 12 decreases, permeance increases. The surface roughness (Ra) of the zeolite membrane 12 is, for example, 5 μm or less, preferably 2 μm or less.

The type of the zeolite constituting the zeolite membrane 12 is not particularly limited. When the zeolite membrane 12 is used as a separation membrane, the maximum number of membered rings in the zeolite is preferably 6 or 8 from the view point of permeation amount of permeable substances and separation performance. More preferably, the maximum number of membered rings in the zeolite membrane 12 is 8.

The zeolite membrane 12 is made of, for example, AFX-type zeolite. In other words, the zeolite membrane 12 is made of a zeolite having a framework type code "AFX" assigned by the International Zeolite Association. In this case, the intrinsic pore diameter of the zeolite constituting the zeolite membrane 12 is 0.34 nm×0.36 nm. The intrinsic pore diameter of the zeolite membrane 12 is smaller than the mean pore diameter of the support 11.

The zeolite membrane 12 is not limited to the AFX-type zeolite, but may also be zeolite having any one of other structures. The zeolite membrane 12 may be any type of zeolite, for example, AEI-type, AEN-type, AFN-type, AFV-type, CHA-type, DDR-type, ERI-type, ETL-type, GIS-type, LEV-type, LTA-type, RHO-type, and SAT-type.

The zeolite membrane 12 contains, for example, one or more of the followings: silicon (Si), aluminum (Al), and phosphorus (P). In the present embodiment, the zeolite membrane 12 is made of aluminosilicate zeolite containing at least Al, Si, and O (oxygen). In the present embodiment, the zeolite membrane 12 contains aluminum oxide ($Al_2O_3$) and silicon dioxide ($SiO_2$).

In the zeolite membrane 12, the content of $SiO_2$ is preferably 10 times or more the content of $Al_2O_3$. In other words, the silica/alumina ratio in the zeolite membrane 12 is preferably greater than or equal to 10. The silica/alumina ratio is more preferably greater than or equal to 12, and yet more preferably greater than or equal to 20. The upper limit of the silica/alumina ratio in the zeolite membrane 12 is not particularly limited. The silica/alumina ratio is typically less than or equal to 10000, and more typically less than or equal to 1000.

Figure 3:
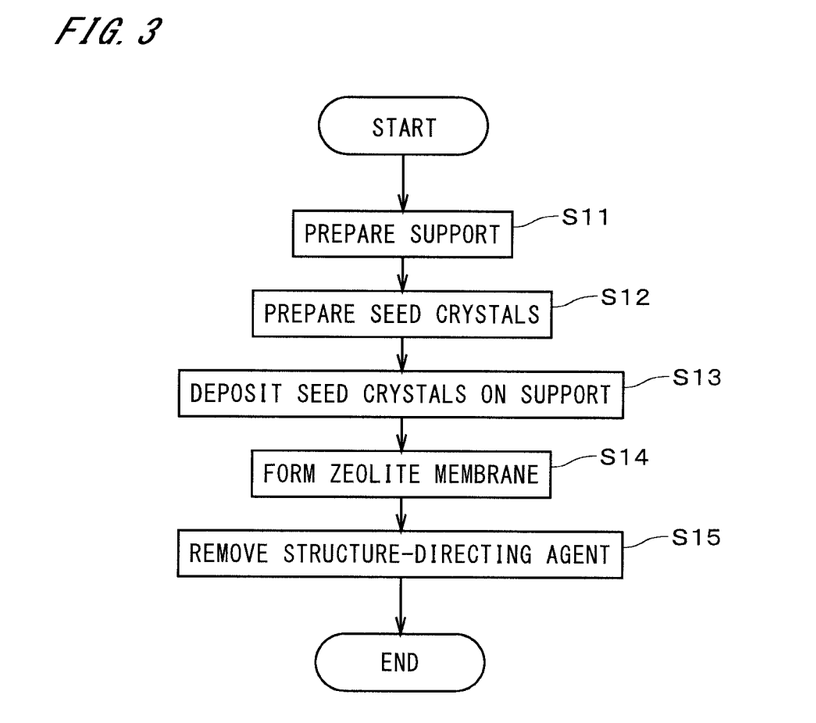
FIG. 3 is a flowchart of production of the zeolite membrane complex.

Next, an example of the procedure for producing the zeolite membrane complex 1 will be described with reference to FIG. 3. First, a support 11 for use in the production of the zeolite membrane complex 1 is prepared (step S11). Additionally, seed crystals for use in the production of the zeolite membrane 12 are prepared (step S12). For example, AFX-type zeolite powder is synthesized by hydrothermal synthesis, and the seed crystals are acquired from the zeolite powder. This zeolite powder may be used as-is as seed crystals, or may be processed into seed crystals by, for example, pulverization. Step S11 and step S12 may be performed in parallel, or step S12 may be performed before step S11.

Then, the porous support 11 is immersed in a solution in which the seed crystals are dispersed, so that the seed crystals are deposited on the support 11 (step S13). Alternatively, a solution in which the seed crystals are dispersed may be brought into contact with a portion of the support 11 on which the zeolite membrane 12 is desired to be formed, so that the seed crystals are deposited on the support 11. In this way, a seed-crystal-deposited support is prepared. The seed crystals may be deposited by other methods on the support 11.

The support 11 with the seed crystals deposited thereon is immersed in a starting material solution. The starting material solution is prepared by, for example, dissolving substances such as an Si source, Al source, and a structure-directing agent (hereinafter, also referred to as an "SDA") in a solvent such as water. The starting material solution has, for example, a composition of $1Al_2O_3$:$23SiO_2$:$10Na_2O$:$2.8SDA$:$1000H_2O$. As the SDA contained in the starting material solution, for example, 1,4-diazabicyclo[2.2.2]octane-C4-diquat dibromide can be used in the case of AFX-type zeolite.

Then, AFX-type zeolite is grown by hydrothermal synthesis using the seed crystals as nuclei to form an AFX-type zeolite membrane 12 on the support 11 (step S14). The temperature of the hydrothermal synthesis is preferably in the range of 110 to 200° C. and, for example, 160° C. The hydrothermal synthesis time is preferably in the range of 10 to 100 hours and, for example, 30 hours. The composition of the AFX-type zeolite membrane 12 can be adjusted by adjusting, for example, the composition ratio of the Si source and the Al source in the starting material solution.

After the hydrothermal synthesis is completed, the support 11 and the zeolite membrane 12 are rinsed with deionized water. After the rinsing, the support 11 and the zeolite membrane 12 are dried at, for example, 80° C. After the support 11 and the zeolite membrane 12 have been dried, the zeolite membrane 12 is subjected to heat treatment so as to burn and remove the SDA in the zeolite membrane 12 and to cause micropores in the zeolite membrane 12 to come through the membrane (step S15). The heating temperature and heating time for the zeolite membrane 12 are, for example, 450° C. and 50 hours. In this way, the aforementioned zeolite membrane complex 1 is obtained. In the case where any SDA is not used for production of the zeolite membrane 12, step S15 of burning and removing the SDA is omitted.

Figure 4:
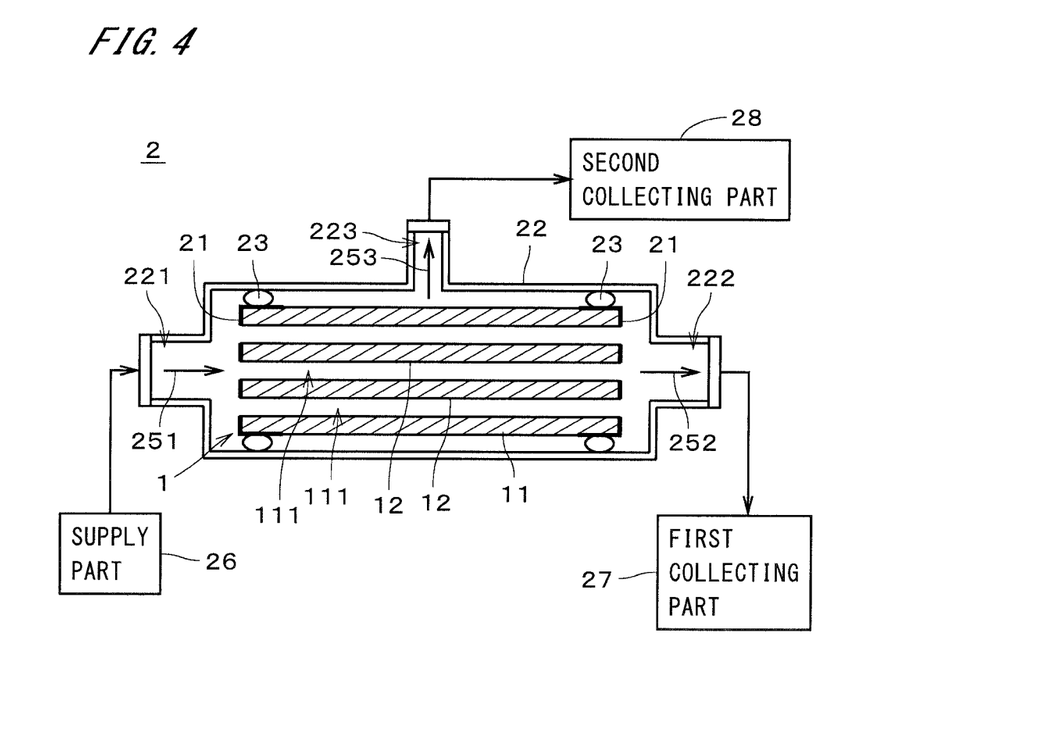
FIG. 4 is a view of a separation apparatus.
Figure 5:
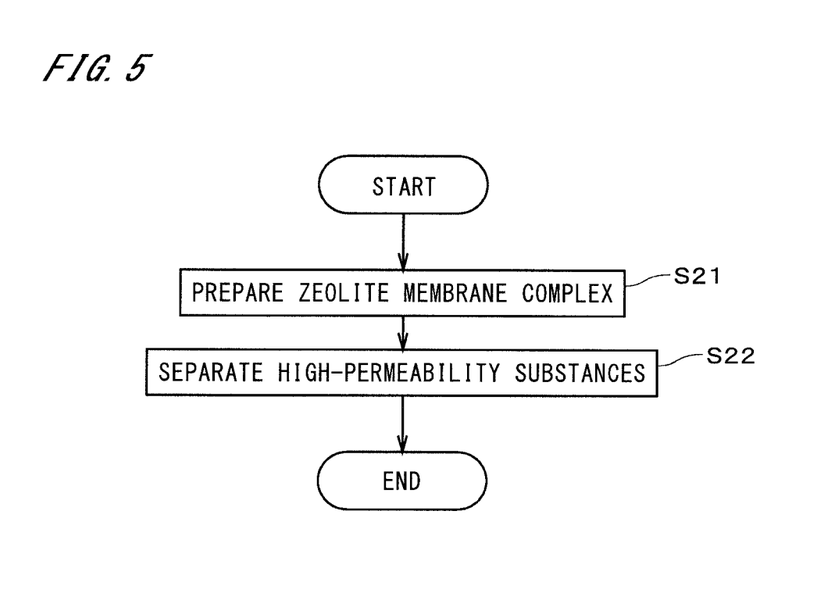
FIG. 5 is a flowchart of separation of a mixture of substances.

Next, the separation of a mixture of substances using the zeolite membrane complex 1 will be described with reference to FIGS. 4 and 5. FIG. 4 is a view of a separation apparatus 2. FIG. 5 is flowchart of the separation of the mixture of substances by the separation apparatus 2.

The separation apparatus 2 supplies a mixture of substances containing a plurality of types of fluids (i.e., gases or liquids) to the zeolite membrane complex 1 and allows a substance with high permeability in the mixture of substances to pass through the zeolite membrane complex 1 so as to separate the substance from other substances. The separation by the separation apparatus 2 may be performed for the purpose of, for example, extracting a substance with high permeability from the mixture of substances or for the purpose of condensing a substance with low permeability.

As described above, the mixture of substances (i.e., a mixture of fluids) may be a mixed gas containing a plurality of types of gases, or may be a mixed liquid containing a plurality of types of liquids, or may be a gas-liquid two-phase fluid containing both gas and liquid.

In the separation apparatus 2, the $CO_2$ permeation amount (permeance) through the zeolite membrane complex 1 at a temperature of 20° C. to 400° C. is, for example, 100 nmol/m$^2$·s·Pa or more. The ratio of $CO_2$ permeation amount to $CH_4$ leakage amount (permeance ratio) in the zeolite membrane complex 1 at a temperature of 20° C. to 400° C. is, for example, 100 or higher. These permeance and permeance ratio are values for the case where a difference in partial pressure of $CO_2$ between the supply and permeation sides of the zeolite membrane complex 1 is 1.5 MPa.

The mixture of substances contains, for example, one or more types of substances including hydrogen ($H_2$), helium (He), nitrogen ($N_2$), oxygen ($O_2$), water ($H_2O$), steam ($H_2O$), carbon monoxide (CO), carbon dioxide ($CO_2$), nitrogen oxide, ammonia ($NH_3$), sulfur oxide, hydrogen sulfide ($H_2S$), sulfur fluoride, mercury (Hg), arsine ($AsH_3$), hydrogen cyanide (HCN), carbonyl sulfide (COS), C1 to C8 hydrocarbons, organic acid, alcohol, mercaptans, ester, ether, ketone, and aldehyde.

Nitrogen oxide is a compound of nitrogen and oxygen. The aforementioned nitrogen oxide is, for example, a gas called $NO_x$ such as nitrogen monoxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), or dinitrogen pentoxide ($N_2O_5$).

Sulfur oxide is a compound of sulfur and oxygen. The aforementioned sulfur oxide is, for example, a gas called $SO_x$ such as sulfur dioxide ($SO_2$) or sulfur trioxide ($SO_3$).

Sulfur fluoride is a compound of fluorine and sulfur. The aforementioned sulfur fluoride is, for example, disulfur difluoride (F—S—S—F, S=$SF_2$), sulfur difluoride ($SF_2$), sulfur tetrafluoride ($SF_4$), sulfur hexafluoride ($SF_6$), or disulfur decafluoride ($S_2F_{10}$).

C1 to C8 hydrocarbons are hydrocarbons containing one to eight carbon atoms. C3 to C8 hydrocarbons may be any one of a linear-chain compound, a side-chain compound, and a cyclic compound. C3 to C8 hydrocarbons may also be either a saturated hydrocarbon (i.e., the absence of double bond and triple bond in a molecule) or an unsaturated hydrocarbon (i.e., the presence of double bond and/or triple bond in a molecule). C1 to C4 hydrocarbons are, for example, methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2$=$CHCH_2CH_3$), 2-butene ($CH_3CH$=$CHCH_3$), or isobutene ($CH_2$=$C(CH_3)_2$).

The aforementioned organic acid is, for example, carboxylic acid or sulfonic acid. The carboxylic acid is, for example, formic acid ($CH_2O_2$), acetic acid ($C_2H_4O_2$), oxalic acid ($C_2H_2O_4$), acrylic acid ($C_3H_4O_2$), or benzoic acid ($C_6H_5COOH$). The sulfonic acid is, for example, ethane sulfonic acid ($C_2H_6O_3S$). The organic acid may be a chain compound or a cyclic compound.

The aforementioned alcohol is, for example, methanol ($CH_3OH$), ethanol ($C_2H_5OH$), isopropanol (2-propanol) ($CH_3CH(OH)CH_3$), ethylene glycol ($CH_2(OH)CH_2(OH)$), or butanol ($C_4H_9OH$).

The mercaptans are organic compounds with hydrogenated sulfur (SH) at their terminals and are substances called also thiol or thioalcohol. The aforementioned mercaptans are, for example, methyl mercaptan ($CH_3SH$), ethyl mercaptan ($C_2H_5SH$), or 1-propane thiol ($C_3H_7SH$).

The aforementioned ester is, for example, formic acid ester or acetic acid ester.

The aforementioned ether is, for example, dimethyl ether (($CH_3)_2O$), methyl ethyl ether ($C_2H_5OCH_3$), or diethyl ether (($C_2H_5)_2O$).

The aforementioned ketone is, for example, acetone (($CH_3)_2CO$), methyl ethyl ketone ($C_2H_5COCH_3$), or diethyl ketone (($C_2H_5)_2CO$).

The aforementioned aldehyde is, for example, acetaldehyde ($CH_3CHO$), propionaldehyde ($C_2H_5CHO$), or butanal (butyraldehyde) ($C_3H_7CHO$).

The following description takes the example of the case where the mixture of substances separated by the separation apparatus 2 is a mixed gas containing a plurality of types of gases.

The separation apparatus 2 includes the zeolite membrane complex 1, sealing parts 21, an outer casing 22, seal members 23, a supply part 26, a first collecting part 27, and a second collecting part 28. The zeolite membrane complex 1, the sealing parts 21, and the seal members 23 are housed in the outer casing 22. The supply part 26, the first collecting part 27, and the second collecting part 28 are disposed outside the outer casing 22 and connected to the outer casing 22.

The sealing parts 21 are members mounted on the opposite ends of the support 11 of the zeolite membrane complex 1 in the longitudinal direction and for covering and sealing the opposite end faces of the support 11 in the longitudinal direction. The sealing parts 21 prevent the inflow and outflow of gases through the opposite end faces of the support 11. The sealing parts 21 are, for example, plate-like members formed of glass. The material and shape of each sealing part 21 may be appropriately changed. The opposite ends of each through hole 111 of the support 11 in the longitudinal direction are not covered by the sealing parts 21. This allows the inflow and outflow of the mixed gas from these opposite ends into the through holes 111.

The outer casing 22 is a tubular member of a substantially circular cylindrical shape. The longitudinal direction of the zeolite membrane complex 1 (the horizontal direction in the drawing) is substantially parallel to the longitudinal direction of the outer casing 22. One end of the outer casing 22 in the longitudinal direction (i.e., left-side end in the drawing) has a supply port 221, and the other end thereof has a first exhaust port 222. The side face of the outer casing 22 has a second exhaust port 223. The internal space of the outer casing 22 is an enclosed space isolated from the space around the outer casing 22.

The supply port 221 is connected to the supply part 26. The supply part 26 supplies a mixed gas to the internal space of the outer casing 22 through the supply port 221. For example, the supply part 26 is a blower that transmits the mixed gas under pressure toward the outer casing 22. The blower includes a pressure regulator that regulates the pressure of the mixed gas supplied to the outer casing 22. The first exhaust port 222 is connected to the first collecting part 27. The second exhaust port 223 is connected to the second collecting part 28. The first collecting part 27 and the second collecting part 28 are, for example, reservoirs for storing gases derived from the outer casing 22.

The seal members 23 are disposed around the entire circumference between the outer side face of the zeolite membrane complex 1 (i.e., the outer side face of the support 11) and the inner side face of the outer casing 22 in the vicinity of the opposite ends of the zeolite membrane complex 1 in the longitudinal direction. Each seal member 23 is a substantially circular ring-shaped member formed of a material impermeable to gases. For example, the seal members 23 are 0 rings formed of a resin having flexibility. The seal members 23 are in intimate contact with the outer side face of the zeolite membrane complex 1 and the inner side face of the outer casing 22 around the entire circumference. The space between the seal member 23 and the outer side face of the zeolite membrane complex 1 and the space between the seal member 23 and the inner side face of the outer casing 22 are sealed so as to disable the passage of gases.

In the separation of the mixed gas, the aforementioned separation apparatus 2 is provided to prepare the zeolite membrane complex 1 (step S21). Then, the mixed gas containing a plurality of types of gases having different permeability to the zeolite membrane 12 is supplied from the supply part 26 to the internal space of the outer casing 22. For example, the mixed gas is composed primarily of $CH_4$, $CO_2$, and $N_2$. The mixed gas may contain gases other than $CH_4$, $CO_2$, and $N_2$. The pressure of the mixed gas supplied from the supply part 26 to the internal space of the outer casing 22 (i.e., initial pressure) is in the range of, for example, 0.1 MPa to 10 MPa.

The mixed gas supplied from the supply part 26 to the outer casing 22 is introduced from the left end of the zeolite membrane complex 1 in the drawing into each through hole 111 of the support 11 as indicated by an arrow 251. Gases having high permeability (e.g., $CO_2$ and $N_2$; hereinafter referred to as "high-permeability substances") in the mixed gas pass through the zeolite membrane 12 provided on the inner side face of each through hole 111 and the support 11, and are emitted from the outer side face of the support 11. In this way, high-permeability substances are separated from gases with low permeability (e.g., $CH_4$; hereinafter referred to as a "low-permeability substance") in the mixed gas (step S22). The gases emitted from the outer side face of the support 11 (i.e., high-permeability substances) are collected by the second collecting part 28 through the second exhaust port 223 as indicated by an arrow 253.

In the mixed gas, gases other than the gases that have passed through the zeolite membrane 12 and the support 11 (hereinafter, referred to as "impermeable substances") pass through each through hole 111 of the support 11 from the left side to the right side in the drawing and are collected by the first collecting part 27 through the first exhaust port 222 as indicated by an arrow 252. In addition to the aforementioned low-permeability substances, the impermeable substances may contain high-permeability substances that did not pass through the zeolite membrane 12.

Next, Examples 1 to 8 and Comparative Examples 1 to 4 each showing the relationship between properties of the support 11 and separation performance of the zeolite membrane 12 will be described with reference to Tables 1 and 2, and FIGS. 6 to 13. The hydraulic conductivity in Table 1 is a hydraulic conductivity of the support 11. The total content in Table 1 is a total content of alkali metal and alkaline earth metal in the surface part 116. The porosity in Table 1 is a porosity of the surface part 116.

In each of Examples 1 to 8, the hydraulic conductivity of the support 11 was less than or equal to $1.1 \times 10^{-3}$ m/s, and the total content of alkali metal and alkaline earth metal in the surface part 116 was less than or equal to 1% by weight. On the other hand, in each of Comparative Examples 1 to 4, the hydraulic conductivity of the support was greater than $1.1 \times 10^{-3}$ m/s, and the total content of alkali metal and alkaline earth metal in the surface part was greater than 1% by weight.

TABLE 1

| | Hydraulic Conductivity (m/s) | Total Content (%) | Porosity (%) | Type of Zeolite Membrane |
|---|---|---|---|---|
| Example1 | $1.1 \times 10^{-3}$ | 0.9 | 40 | AFX |
| Example2 | $5.8 \times 10^{-4}$ | 0.9 | 37 | AFX |
| Example3 | $2.3 \times 10^{-4}$ | 0.9 | 35 | AFX |
| Example4 | $2.1 \times 10^{-4}$ | 0.5 | 35 | AFX |
| Example5 | $1.8 \times 10^{-4}$ | 0.01 | 32 | AFX |
| Example6 | $5.8 \times 10^{-4}$ | 0.9 | 37 | DDR |
| Example7 | $2.3 \times 10^{-4}$ | 0.9 | 35 | DDR |
| Example8 | $1.3 \times 10^{-4}$ | 0.1 | 35 | CHA |
| Comparative Example1 | $1.9 \times 10^{-3}$ | 1.1 | 52 | AFX |
| Comparative Example2 | $1.3 \times 10^{-3}$ | 1.1 | 49 | AFX |
| Comparative Example3 | $1.9 \times 10^{-3}$ | 1.1 | 52 | DDR |
| Comparative Example4 | $1.9 \times 10^{-3}$ | 1.1 | 52 | CHA |

TABLE 2

| | Different Phase (XRD) | Surface Abnormality Percentage (SEM) | Denseness |
|---|---|---|---|
| Example1 | Absent | 1% or less | ○ |
| Example2 | Absent | 1% or less | ○ |
| Example3 | Absent | 1% or less | ○ |
| Example4 | Absent | 1% or less | ○ |
| Example5 | Absent | 1% or less | ○ |
| Example6 | — | 6% | ○ |
| Example7 | Absent | 1% or less | ○ |
| Example8 | Absent | Below detection limit | ○ |
| Comparative Example1 | Present | 15%< | x |
| Comparative Example2 | Present | 20%< | x |
| Comparative Example3 | Present | 80%< | x |
| Comparative Example4 | Present | Below detection limit | x |

Figure 6:
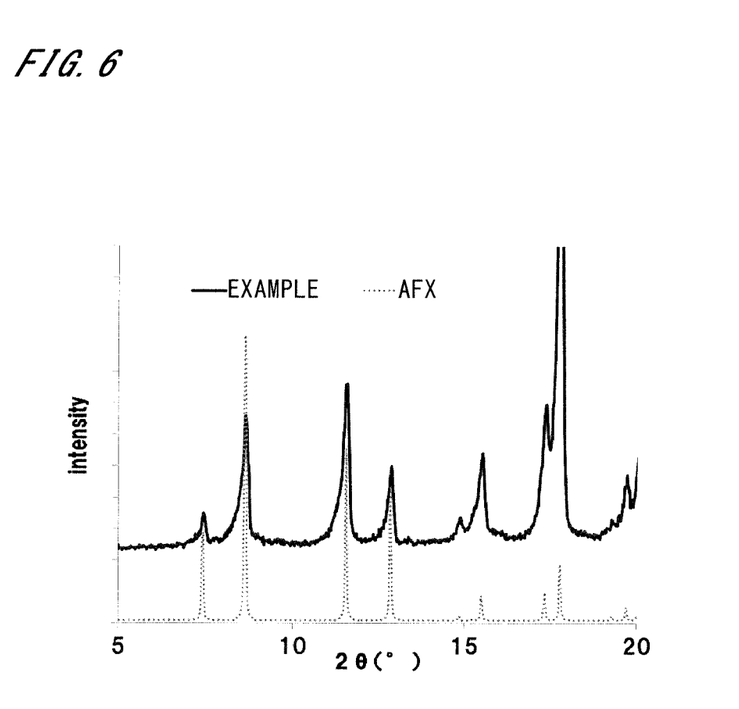
FIG. 6 is an X-ray diffraction pattern of a zeolite membrane according to an example.
Figure 7:
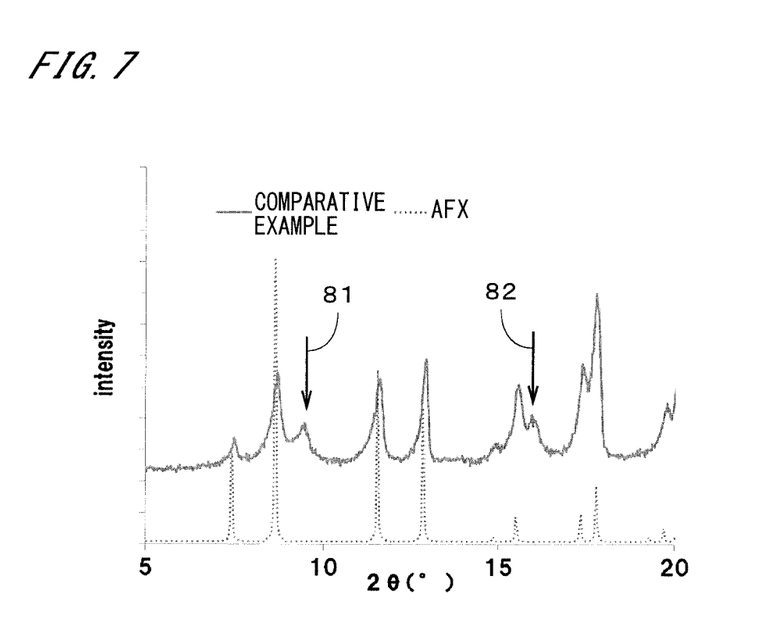
FIG. 7 is an X-ray diffraction pattern of a zeolite membrane according to a comparative example.

FIG. 6 is an X-ray diffraction pattern obtained by measuring the zeolite membrane 12 of Example 1 with an X-ray diffraction (XRD) apparatus. FIG. 7 is an X-ray diffraction pattern obtained by measuring the zeolite membrane of Comparative Example 1 with the X-ray diffraction apparatus. In each of FIGS. 6 and 7, the X-ray diffraction pattern of the zeolite membrane is indicated by the solid line, and the X-ray diffraction pattern of AFX-type zeolite crystal is indicated by the dashed line. For the measurement of the X-ray diffraction pattern, MiniFlex600 manufactured by Rigaku Corporation was used.

The X-ray used for the X-ray diffraction is a CuKα line. Further, an output of the X-ray is 600 W. The tube voltage was 40 kV, the tube current was 15 mA, the scanning speed was 5°/min, and the scanning step was 0.02°. As a detector, a scintillation counter was used. The divergence slit was 1.25°, the scattering slit was 1.25°, the receiving slit was 0.3 mm, the incident solar slit was 5.0°, and the light-receiving solar slit was 5.0°. A monochromator was not used, and a nickel foil having a thickness of 0.015 mm was used as a CuKβ line filter.

From FIGS. 6 and 7, it can be seen that the AFX-type zeolite membrane of Comparative Example 1 includes different phase having a different composition from that of the AFX-type zeolite while the zeolite membrane 12 of Example 1 is almost single-phase AFX-type zeolite. In Comparative Example 1 shown in FIG. 7, peaks (and halos) corresponding to the different phase appear at positions indicated by arrows 81, 82. It is conceivable that the different phase in Comparative Example 1 is formed because of elution of alkali metal and/or alkaline earth metal contained in the surface part of the support during hydrothermal synthesis.

Also in Examples 2 to 8 and Comparative Examples 2 to 4, the presence or absence of different phase was determined by XRD in the same way as Example 1 and Comparative Example 1. The zeolite membrane 12 of each of Examples 2 to 5 was almost single-phase AFX-type zeolite and included almost no different phase, similar to Example 1. Meanwhile, the AFX-type zeolite membrane of Comparative Example 2 included different phase having a different composition from that of the AFX-type zeolite, similar to Comparative Example 1. The zeolite membrane 12 of each of Examples 6 and 7 was almost single-phase DDR-type zeolite and included almost no different phase. Meanwhile, the DDR-type zeolite membrane of Comparative Example 3 included different phase having a different composition from that of the DDR-type zeolite. The zeolite membrane 12 of Example 8 was almost single-phase CHA-type zeolite and included almost no different phase. Meanwhile, the CHA-type zeolite membrane of Comparative Example 4 included different phase having a different composition from that of the CHA-type zeolite.

Figure 8:
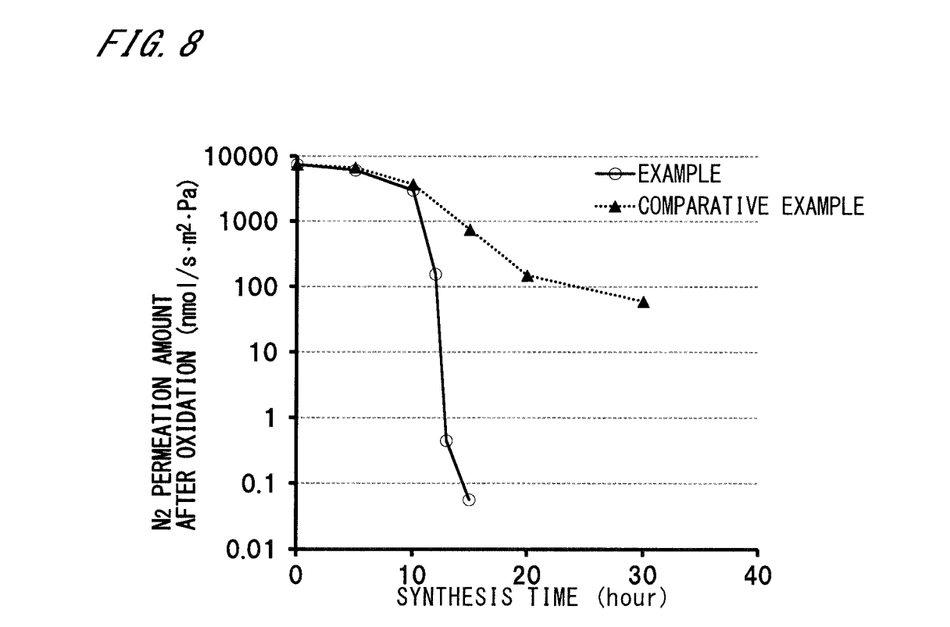
FIG. 8 is a view showing a relationship between hydrothermal synthesis time and nitrogen permeation amount.

FIG. 8 is a view showing a relationship between hydrothermal synthesis time in production of the zeolite membrane 12 of Example 1 and $N_2$ permeation amount (nmol/$m^2 \cdot s \cdot Pa$) in the zeolite membrane 12 synthesized by the hydrothermal synthesis. In FIG. 8, the relationship in the zeolite membrane of Comparative Example 1 is also shown. The zeolite membrane 12 of Example 1 became denser as the hydrothermal synthesis time increased, and the $N_2$ permeation amount was promptly reduced to a practicable level. On the other hand, the zeolite membrane of Comparative Example 1 did not become dense enough even when the hydrothermal synthesis time increased, because the different phase was synthesized as by-product in the zeolite membrane as described above.

Also in Examples 2 to 8 and Comparative Examples 2 to 4, the $N_2$ permeation amount of the zeolite membrane was confirmed in the same way as Example 1 and Comparative Example 1. Similar to Example 1, the zeolite membrane 12 of each of Examples 2 to 8 became denser as the hydrothermal synthesis time increased, and the $N_2$ permeation amount was promptly reduced to a practicable level. On the other hand, similar to Comparative Example 1, the zeolite membrane of each of Comparative Examples 2 to 4 did not become dense enough even when the hydrothermal synthesis time increased.

Figure 9:
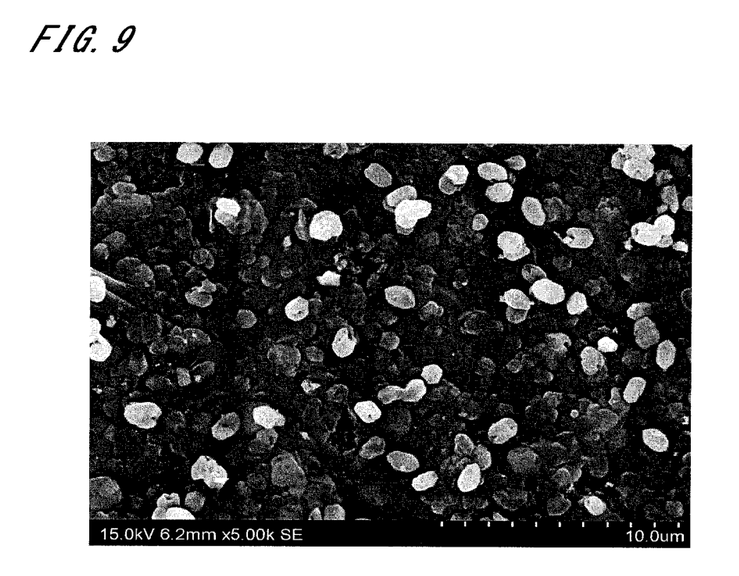
FIG. 9 is a view of a surface of the zeolite membrane according to the example.
Figure 10:
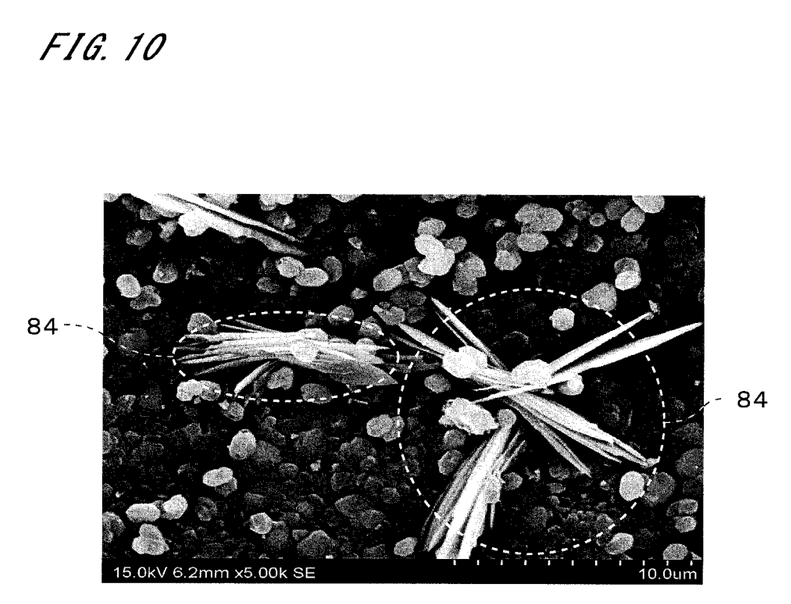
FIG. 10 is a view of a surface of the zeolite membrane according to the comparative example.

The aforementioned different phase grows together with growth of the zeolite membrane. Some of the different phase appear in the surface of the zeolite membrane, and others remain inside the zeolite membrane and do not appear in the surface. FIG. 9 is a SEM image of the surface of the AFX-type zeolite membrane 12 of Example 1. FIG. 10 is a SEM image of the surface of the AFX-type zeolite membrane of Comparative Example 1. In the zeolite membrane of Comparative Example 1 shown in FIG. 10, surface abnormality occurs in the surface of the zeolite membrane at positions surrounded by circles with a reference sign 84. The surface abnormality includes, for example, different phase crystal resulting from alkali metal and/or alkaline earth metal, amorphia, pinhole, or the like. On the other hand, in the zeolite membrane 12 of Example 1 shown in FIG. 9, surface abnormality can hardly be observed in the surface of the zeolite membrane 12.

Figure 11:
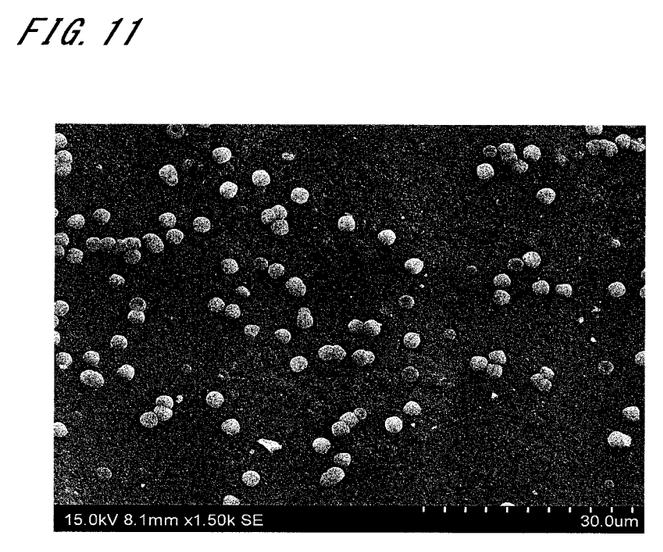
FIG. 11 is a view of a surface of a zeolite membrane according to an example.
Figure 12:
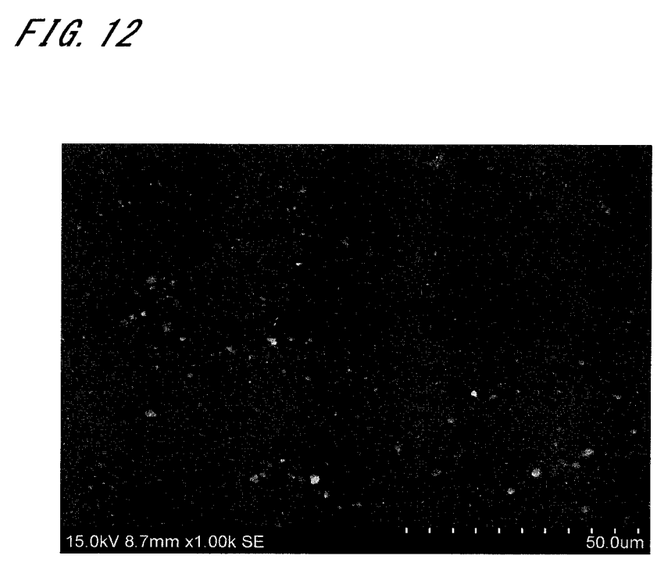
FIG. 12 is a view of a surface of a zeolite membrane according to an example.
Figure 13:
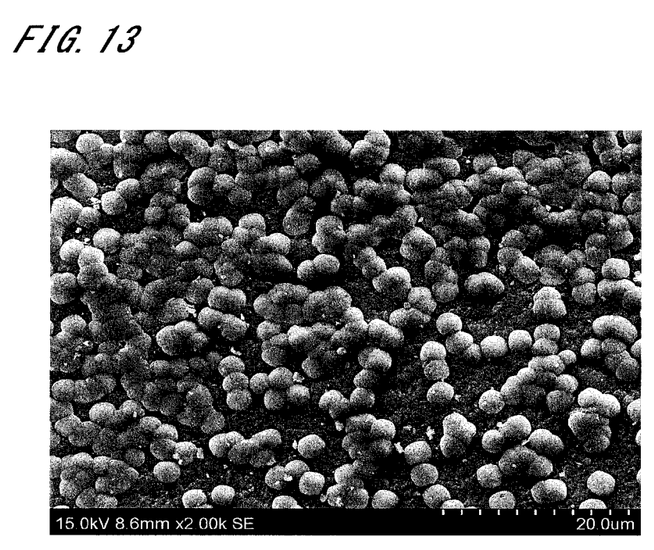
FIG. 13 is a view of a surface of a zeolite membrane according to a comparative example.

FIGS. 11 and 12 are SEM images of the surfaces of the DDR-type zeolite membranes 12 of Examples 6 and 7. FIG. 13 is a SEM image of the surface of the DDR-type zeolite membrane of Comparative Example 3. In the zeolite membrane 12 of Example 6 shown in FIG. 11, surface abnormality of the zeolite membrane 12 (i.e., whitish granular portions in the drawing) slightly appears. In the zeolite membrane 12 of Example 7 shown in FIG. 12, surface abnormality of the zeolite membrane 12 can hardly be observed. On the other hand, in the zeolite membrane of Comparative Example 3 shown in FIG. 13, surface abnormality (i.e., areas where whitish granular portions are continuous or fused in the drawing) occurs at a lot of positions in the surface of the zeolite membrane 12.

In the zeolite membrane complex 1 according to the present invention, the percentage of surface abnormality (hereinafter, referred to as "surface abnormality percentage") in the surface of the zeolite membrane 12 is preferably less than or equal to 15%. The surface abnormality percentage is a percentage of total area of surface abnormality existing in the surface of the zeolite membrane 12 in the total area of the surface of the zeolite membrane 12. The surface abnormality percentage in the zeolite membrane 12 is more preferably less than or equal to 10%, and yet more preferably less than or equal to 1%. The lower limit of the surface abnormality percentage is not particularly limited. The surface abnormality percentage is typically greater than or equal to 0.01%, and more typically greater than or equal to 0.1%.

The aforementioned surface abnormality percentage is obtained as below. First, a region having a predetermined size is specified in the SEM image of the surface of the zeolite membrane 12, and the surface abnormality percentage in the region is calculated by dividing the total area of surface abnormality existing in the region by the total area of the region. Then, an average of surface abnormality percentages calculated in ten regions in the SEM image is obtained as the surface abnormality percentage of the surface of the zeolite membrane 12.

The surface abnormality percentages of the zeolite membranes 12 of Examples 1 to 5, and 7 were less than or equal to 1%, and the surface abnormality percentage of the zeolite membrane 12 of Example 6 was 6%. In the CHA-type zeolite membrane 12 of Example 8, surface abnormality such as different phase crystal was not observed in the SEM image of the surface of the zeolite membrane 12, and thus, "below detection limit" is put in Table 2. On the other hand, the surface abnormality percentage of the zeolite membrane of Comparative Example 1 was greater than 15%, and the surface abnormality percentage of the zeolite membrane of Comparative Example 2 was greater than 20%. The surface abnormality percentage of the zeolite membrane of Comparative Example 3 was greater than 80%. In the zeolite membrane of Comparative Example 4, surface abnormality was not observed in the SEM image, similar to Example 8. However, it is conceivable that, in Comparative Example 4, different phase which remains inside the zeolite membrane and which does not appear in the surface is more likely to exit, considering that the zeolite membrane has a low denseness as above.

As described above, the support 11 is a porous ceramic support for supporting a zeolite membrane. The hydraulic conductivity of the support 11 is less than or equal to $1.1 \times 10^{-3}$ m/s. In the support 11, the total content of alkali metal and alkaline earth metal in the surface part 116 within 30 μm from the surface 114 in the depth direction perpendicular to the surface 114 is less than or equal to 1% by weight.

As above, the total content of alkali metal and alkaline earth metal in the surface part 116 is reduced to less than or equal to 1% by weight, and this suppresses elution of alkali metal and alkaline earth metal from the surface part 116 during hydrothermal synthesis for production of the zeolite membrane 12. The hydraulic conductivity of the support 11 is reduced to less than or equal to $1.1 \times 10^{-3}$ m/s. Therefore, even when alkali metal and alkaline earth metal are eluted in the surface part 116, eluted alkali metal and alkaline earth metal can be suppressed from flowing out of the surface 114 of the support 11 into the starting material solution and the zeolite membrane 12 during synthesis. As a result, it is possible to suppress occurrence of abnormality in the zeolite membrane 12 due to alkali metal and/or alkaline earth metal.

As described above, the abnormality which is suppressed from occurring by the support 11 includes followings: synthesis of a zeolite membrane having a composition ratio different from a desired composition ratio, performance degradation of the zeolite membrane due to different phase synthesized as by-product in the zeolite membrane, defect (e.g., pinholes) caused by inhibition of synthesis of the zeolite membrane, or the like.

Even if elution of alkali metal and alkaline earth metal occurs in a portion located deeper than the surface part 116 in the support 11 (e.g., the support layer 113), it is conceivable that the synthesis of the zeolite membrane 12 is not adversely affected because the alkali metal and alkaline earth metal hardly reach the surface 114 of the support 11. Thus, the total content of alkali metal and alkaline earth metal in the support layer 113 may be greater than 1% by weight.

As above, the porosity of the surface part 116 in the support 11 is preferably less than or equal to 50%. Because the porosity is reduced in this manner, elution of alkali metal and alkaline earth metal from the surface part 116 during hydrothermal synthesis can be further suppressed. Even when alkali metal and alkaline earth metal are eluted in the surface part 116, eluted alkali metal and alkaline earth metal can be further suppressed from flowing out of the surface 114 of the support 11 into the starting material solution and the zeolite membrane 12 during synthesis. As a result, it is possible to further suppress occurrence of abnormality in the zeolite membrane 12.

As above, the support 11 preferably includes the intermediate layer 112 including the surface part 116, and the support layer 113 having a mean particle diameter greater than that of the intermediate layer 112. The support layer 113 supports the intermediate layer 112 from the side opposite to the surface 114 of the intermediate layer 112 which comes into contact with the zeolite membrane 12. Thus, when selecting materials of the support layer 113 or the like, there is no necessity to consider the total content of alkali metal and alkaline earth metal in the surface part 116, and the porosity of the surface part 116. It is therefore possible to increase the degree of freedom in material selection of the support layer 113 and to facilitate production of the support 11.

The zeolite membrane complex 1 includes the above support 11, and the zeolite membrane 12 formed on the surface 114 of the support 11. This makes it possible to provide the zeolite membrane complex 1 including the dense zeolite membrane 12 with little abnormality due to alkali metal and/or alkaline earth metal.

As above, the percentage of surface abnormality in the surface of the zeolite membrane 12 is preferably less than or equal to 15%. This makes it possible to provide the zeolite membrane complex 1 including the denser zeolite membrane 12.

In the zeolite membrane complex 1, the thickness of the zeolite membrane 12 is preferably greater than or equal to 0.1 μm and less than or equal to 30 μm. It is therefore possible to appropriately satisfy both of separation performance and permeance in the zeolite membrane 12.

As above, occurrence of abnormality in the zeolite membrane 12 due to alkali metal and/or alkaline earth metal can be suppressed in the zeolite membrane complex 1. Thus, the structure of the zeolite membrane complex 1 is particularly suitable to a zeolite membrane complex including the zeolite membrane 12 which has the silica/alumina ratio greater than or equal to 10 (i.e., the zeolite membrane 12 in which the content of $SiO_2$ is 10 times or more the content of $Al_2O_3$) and thereby is relatively likely to be adversely affected by alkali metal and alkaline earth metal.

As above, the method of producing the zeolite membrane complex 1 includes the step (step S11) of preparing the above support 11, the step (step S12) of preparing seed crystals, the step (step S13) of depositing the seed crystals on the porous support 11, and the step (step S14) of immersing the support 11 in a starting material solution and growing zeolite from the seed crystals by hydrothermal synthesis, to thereby form the zeolite membrane 12 on the support 11. It is therefore possible to easily produce the zeolite membrane complex 1 including the dense zeolite membrane 12 with little abnormality due to alkali metal and/or alkaline earth metal.

The above separation method includes the step (step S21) of preparing the zeolite membrane complex 1, and the step (step S22) of supplying a mixture of substances containing a plurality of types of gases or liquids to the zeolite membrane complex 1 and allowing a high-permeability substance in the mixture of substances to permeate through the zeolite membrane complex 1, to thereby separate the high-permeability substance from other substances.

As above, because the zeolite membrane complex 1 includes the dense zeolite membrane 12 with little abnormality due to alkali metal and/or alkaline earth metal, the separation method can efficiently separate the mixture of substances. The separation method is particularly suitable to separation of the mixture of substances includes at least one of following substances: hydrogen, helium, nitrogen, oxygen, water, steam, carbon monoxide, carbon dioxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

The support 11, the zeolite membrane complex 1, the method of producing the zeolite membrane complex 1, and the separation method described above may be modified in various ways.

For example, the porosity of the surface part 116 in the support 11 may be greater than 50%.

The support 11 does not necessarily have to be a double-layer structure composed of the intermediate layer 112 and the support layer 113, and the support 11 may be, for example, a multilayer structure in which three or more layers having different mean particle diameters or the like are laminated one above another. Alternatively, the support 11 may be a single-layer structure composed of a single layer. In this case, a portion of the single layer within 30 μm from a surface is the aforementioned surface part 116.

In the zeolite membrane complex 1, the percentage of surface abnormality in the surface of the zeolite membrane 12 may be greater than 15%.

In the zeolite membrane complex 1, the thickness of the zeolite membrane 12 may be less than 0.1 μm or greater than 30 μm.

In the zeolite membrane complex 1, the composition of the zeolite membrane 12 may be changed in various ways. For example, the content of $SiO_2$ in the zeolite membrane 12 may be less than 10 times the content of $Al_2O_3$. The content of $Al_2O_3$ in the zeolite membrane 12 may be substantially 0% by weight.

In the separation apparatus 2 and the separation method, substances other than the substance exemplified in the above description may be separated from the mixture of substances.

The configurations of the above-described preferred embodiments and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The ceramic support according to the present invention can be used, for example, for supporting a zeolite membrane which is available as a gas separation membrane. The zeolite membrane complex according to the present invention can be used in various fields using zeolites as a gas separator membrane, a separator membrane for substances other than gases, an adsorbent membrane for various substances, or the like.

REFERENCE SIGNS LIST

1 Zeolite membrane complex
11 Support
12 Zeolite membrane
112 Intermediate layer
113 Support layer
114 Surface (of support)
116 Surface part
S11 to S15, S21, S22 Step

The invention claimed is:

1. A porous ceramic support for supporting a zeolite membrane, wherein
   a hydraulic conductivity is less than or equal to $1.1 \times 10^{-3}$ m/s, and
   a total content of alkali metal and alkaline earth metal in a surface part within 30 μm from a surface in a depth direction perpendicular to said surface is less than or equal to 1% by weight.

2. The ceramic support according to claim 1, wherein a porosity of said surface part is less than or equal to 50%.

3. The ceramic support according to claim 1, comprising:
   an intermediate layer including said surface part; and
   a support layer that supports said intermediate layer from a side opposite to a surface of said intermediate layer which comes into contact with a zeolite membrane, said support layer having a mean particle diameter greater than that of said intermediate layer.

4. A zeolite membrane complex comprising:
   the ceramic support according to claim 1; and
   a zeolite membrane formed on said surface of said ceramic support.

5. The zeolite membrane complex according to claim 4, wherein
   a percentage of surface abnormality in a surface of said zeolite membrane is less than or equal to 15%.

6. The zeolite membrane complex according to claim 4, wherein
   a thickness of said zeolite membrane is greater than or equal to 0.1 μm and less than or equal to 30 μm.

7. The zeolite membrane complex according to claim 4, wherein
   a content of silicon oxide in said zeolite membrane is 10 times or more a content of aluminum oxide.

8. A method of producing a zeolite membrane complex, comprising:
   a) preparing the ceramic support according to claim 1;
   b) preparing seed crystals;
   c) depositing said seed crystals on said ceramic support; and
   d) immersing said ceramic support in a starting material solution and growing zeolite from said seed crystals by hydrothermal synthesis, to thereby form a zeolite membrane on said ceramic support.

9. A separation method comprising:
   a) preparing the zeolite membrane complex according to claim 4; and
   b) supplying a mixture of substances containing a plurality of types of gases or liquids to said zeolite membrane complex and allowing a high-permeability substance in said mixture of substances to permeate through said zeolite membrane complex, to thereby separate said high-permeability substance from other substances.

10. The separation method according to claim 9, wherein said mixture of substances includes at least one of following substances: hydrogen, helium, nitrogen, oxygen, water, steam, carbon monoxide, carbon dioxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

* * * * *